Patented Dec. 31, 1929

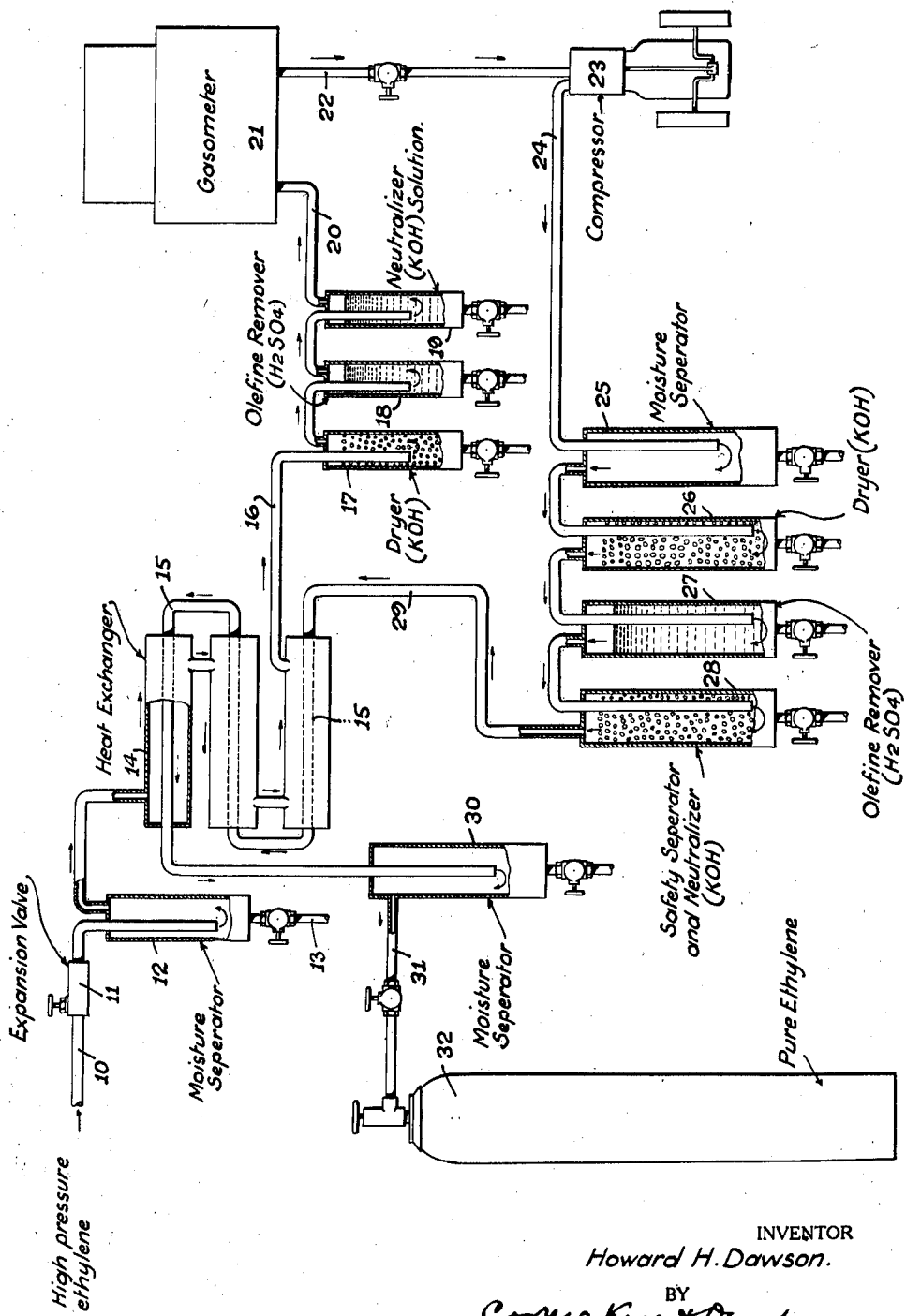

1,741,559

UNITED STATES PATENT OFFICE

HOWARD H. DAWSON, OF CLEVELAND, OHIO, ASSIGNOR TO THE OHIO CHEMICAL & MANUFACTURING COMPANY, OF CLEVELAND, OHIO, A CORPORATION OF OHIO

PURIFICATION OF ETHYLENE

Application filed January 7, 1925. Serial No. 943.

This invention relates to the purification of gases, more particularly ethylene, for purposes of anesthesia.

Commercial ethylene as now produced is pyrogenetic in its origin, that is, it is produced by the action of heat on other materials. In some cases the reaction is carried out in the presence of a contact material or catalyst, and in other cases no such material is used. One of the materials commonly employed for the production of ethylene is ethyl alcohol, and although not in any way confining myself to ethylene made from ethyl alcohol, I propose, in this specification, to use such ethylene in a specific example of my process for the purpose of convenient explanation.

Ethylene is commonly produced from ethyl alcohol by submitting the alcohol vapor to heat while in contact with some catalytic substance, such as kaolin or alumina. After the heat treatment the ethylene is cooled and compressed into cylinders for shipment. Due to the fact that some of the alcohol remains unconverted into ethylene, and also to the fact that side reactions occur, the ethylene produced may and often does contain butylene, propylene, and unconverted alcohol. There may also be traces of tar, benzole, and other substances which are normally liquid or solid. Inasmuch as ethylene, before compression, is usually stored in water-sealed gasometers, the gas also usually contains residual moisture from the pyrogenetic reaction, or from evaporation in the gasometer, or both.

The chief object of my invention is to remove, as completely as possible, impurities of the kind indicated above, to the end that the ethylene will be sweet and free from objectionable impurities, and therefore more suitable for anesthetic purposes than is the gas hitherto obtainable. My improved process may be carried out by any suitable apparatus, as for example an apparatus of the type illustrated diagrammatically in the accompanying drawing.

In the drawing, the pipe 10 is intended to represent a source of ethylene under pressure, preferably more than about 1500 pounds per square inch, and may lead from a receptacle (not shown) containing previously compressed gas with more or less, or all, of the heat of compression removed. Or the pipe may lead from a compressor and cooler (not shown) for delivering the high pressure gas at a suitable temperature, preferably at about room temperature. This gas is expanded at the expansion valve 11 to a substantially lower pressure, preferably about atmospheric. The expansion produces a corresponding drop in temperature, and the cold expanded gas enters the trap 12, where more or less of any materials present which are condensible at the prevailing temperature and pressure, such as propylene, butylene, benzole, tar, ether, and alcohol, are collected for withdrawal from time to time through the valved outlet pipe 13. From the trap 12 the gas passes to the regenerator 14, through which it flows in counter-current heat-exchanging relation with warmer high pressure gas (in pipe 15) which has already passed through the purification cycle or through all but the last step thereof. This flow through the regenerator or heat exchanger warms the low pressure ethylene, which emerges at, say, room temperature.

Some of the impurities which were not removed in trap 12 passes on with the ethylene through pipe 16 to a dryer 17, containing caustic potash in lumps or sticks, or other suitable drying agent, to catch any moisture, which has been frozen and subsequently thawed, from the regenerator 14. The gas next passes to purifier 18, which is partially filled with a suitable reagent, preferably sulfuric acid with or without a catalyst, for the removal of butylene and propylene. In general the sulfuric acid should not be strong enough to react with the ethylene, and hence should not be "fuming". Acid having a specific gravity of not more than 1.84 (water = 1.00) is satisfactory, and good results have been obtained with 66° B. acid. The gas now passes to purifier or neutralizer 19, containing caustic potash solution, for the neutralization of any sulfuric acid that may escape with the gas from purifier 18. The strength of the neutralizing solution is largely immaterial, so long as it remains alkaline, but ordinarily should not be less than about 5 per cent, ranging up to saturation. Preferably it is of such strength and amount as to last as long as the sulfuric acid used in the preceding step so that renewal of both may be effected at the same time. Caustic soda or milk of lime may be employed in lieu of the potash but the latter is preferred. From the neutralizer 19 the gas is carried through pipe 20 to a gasometer 21, which may be of the water-sealed type, acting in both a storage and a relief capacity. From the gasometer the ethylene, which may be saturated with moisture from the gasometer, is conducted by pipe 22 to a compressor 23, where it is raised to a suitably high pressure, preferably somewhere between 1000 and 1200 pounds per square inch, approximately, so that the further treatment may be carried out at a pressure which is substantial but less than would result in liquefaction, which would be undesirable for the reason that liquid ethylene would tend to carry along sulfuric acid by mechanical admixture, even into the bottle or cylinder in which the gas is finally stored for shipment and use.

From compressor 23 the highly compressed gas is led by pipe 24 to a separator 25, where more or less of the moisture condensed during compression is separated and may be drained off from time to time from the bottom. From the separator the gas passes to a purifier 26 containing lumps or sticks of caustic potash for the removal of the last traces of water.

From purifier 26 the gas next passes to purifier 27, containing sulfuric acid, preferably chemically pure and of 66° B. strength or higher. The acid combines with olefines such as butylene, propylene, pentylene, and similar unsaturated compounds, so that the ethylene emerges in a practically pure condition, except perhaps for traces of alcohol vapor which were in the gas when originally produced. The ethylene thus purified now passes to a safety separator 28, containing caustic potash in sticks or lumps, which catches mist or spray of sulfuric acid from the purifier 27.

The ethylene, now free from moisture and still at a relatively high temperature, is conveyed by pipe 29 to the high-pressure coil 15 of the regenerator 14, where it passes in heat-exchanging counter-current relation to the cold expanded ethylene, as previously described. Due to the high pressure and to the cooling effect here produced, any traces of alcohol and moisture which have survived the treatment upto this point tend to condense in the regenerator coil 15 and are carried as a mist with the gas stream to a separator 30, where they are collected for removal from time to time as required. The pure dry ethylene, still at a high pressure and relatively low temperature, passes through valve pipe 31 to the cylinder 32. The low temperature permits the cylinder to be filled more easily than would be the case if the gas had not been cooled.

I do not wish to be confined to the exact procedure or apparatus outlined above, which are merely examples of a convenient way to carry out my process. Any other means may be used for the purpose which utilize the expansion of high pressure ethylene to produce cold for subsequent drying and cooling, and which also dry the gas with a suitable moisture-absorber before bringing it into contact with an agent for the removal of unsaturated hydrocarbon impurities. Drying of the gas before treatment with sulfuric acid is of special importance, since contact of moist ethylene containing other unsaturated compounds such as propylene and butylene, with sulfuric acid, will cause the formation of alcohols which must subsequently be removed.

It will be seen that the process can be carried on continuously as long as a continuous supply of the impure ethylene is maintained, with only occasional stoppage for renewal of the reagents employed.

By means of my process ethylene containing relatively large amounts of impurities may be effectively and economically purified, bringing the content of objectionable impurities, such as propylene, butylene, alcohol, tar, benzole, etc., down to, say, 0.1 per cent or less. This extreme purity is not always necessary, however, and it has been found that if the total impurity content, including air and additional nitrogen, which constitute the major portion of the impurities present, is reduced to about 1 per cent or less, the ethylene can be used for anesthesia in practically all cases, without harmful effects upon the patient and without fouling of the apparatus by rapid accumulation of condensible substances.

I claim—

1. In a process for purifying ethylene, the steps comprising expanding compressed ethylene to cool the same to a relatively low temperature and thereby cause condensation of impurities, removing impurities so condensed, including moisture, from the cold expanded gas, passing the cold expanded gas in heat-exchanging relation to warmer compressed ethylene to warm the former and cool the latter, compressing the warmed gas and removing moisture therefrom, treating the gas thereafter with sulfuric acid to remove olefine impurities, passing the gas in the above mentioned heat-exchanging relation to the cold expanded ethylene, and removing impurities condensed or frozen in such passage.

2. In a process for purifying ethylene, the steps comprising removing moisture from the gas and thereafter treating the dried gas with sulfuric acid strong enough to combine with olefine impurities without reaction with the ethylene itself, at a pressure greater than about 1000 pounds per square inch.

3. A process of purifying ethylene, comprising expanding relatively warm ethylene from a pressure of about 1500 pounds per square inch and utilizing the resulting cold gas to cool compressed and relatively warm ethylene, drying the expanded and now relatively warm ethylene, treating it with sulfuric acid to remove olefine impurities without reaction with the ethylene itself, neutralizing any sulfuric acid carried away by the gas, compressing the gas to a pressure between 1000 and 1200 pounds per square inch, and drying it again, treating it again with sulfuric acid for further removal of relatively heavy hydrocarbons without reaction with the ethylene itself, neutralizing acid carried by the gas from the last mentioned step, passing the gas in the above mentioned heat-exchanging relation with the cold expanded ethylene, removing impurities condensed or frozen in the course of the heat-exchange, and collecting the dry purified gas at a pressure less than that from which it was initially expanded.

In testimony whereof I hereto affix my signature.

HOWARD H. DAWSON.